United States Patent [19]
Straforini et al.

[11] Patent Number: 6,092,059
[45] Date of Patent: *Jul. 18, 2000

[54] AUTOMATIC CLASSIFIER FOR REAL TIME INSPECTION AND CLASSIFICATION

[75] Inventors: Marco L. Straforini, Kensington; Sherrill E. Lavagnino, Oakland, both of Calif.; John C. Badger, Paris, France; Jeffrey M. Wolinsky; Bret R. Tilson, both of Berkeley, Calif.

[73] Assignee: Cognex Corporation, Natick, Mass.

[*] Notice: This patent issued on a continued prosecution application filed under 37 CFR 1.53(d), and is subject to the twenty year patent term provisions of 35 U.S.C. 154(a)(2).

[21] Appl. No.: 08/777,367

[22] Filed: Dec. 27, 1996

[51] Int. Cl.$^7$ ...................................................... G06F 15/18
[52] U.S. Cl. ................................ 706/14; 706/20; 706/10; 706/47
[58] Field of Search .................................. 706/14, 20, 10, 706/47, 12; 382/157, 158, 159; 328/128; 378/37

[56] References Cited

U.S. PATENT DOCUMENTS

| | | | |
|---|---|---|---|
| 4,519,041 | 5/1985 | Fant et al. | 382/141 |
| 4,587,617 | 5/1986 | Barker et al. | 382/149 |
| 4,760,604 | 7/1988 | Cooper et al. | 382/155 |
| 4,958,375 | 9/1990 | Reilly et al. | 382/159 |
| 5,048,100 | 9/1991 | Kuperstein | 382/157 |
| 5,175,769 | 12/1992 | Refregier et al. | 704/211 |
| 5,179,419 | 1/1993 | Palmquist et al. | 356/73.1 |
| 5,239,594 | 8/1993 | Yoda | 382/158 |
| 5,426,684 | 6/1995 | Gaborski et al. | 378/62 |
| 5,544,256 | 8/1996 | Brecher et al. | 382/149 |
| 5,572,597 | 11/1996 | Change et al. | 382/125 |
| 5,596,993 | 1/1997 | Oriol et al. | 600/511 |
| 5,675,711 | 10/1997 | Kephart et al. | 706/12 |
| 5,678,677 | 10/1997 | Baudat | 194/206 |
| 5,680,476 | 10/1997 | Schmidt et al. | 382/159 |
| 5,737,716 | 4/1998 | Bergstrom et al. | 704/202 |
| 5,768,333 | 6/1998 | Abdel-Mottaleb | 378/37 |
| 5,790,690 | 8/1998 | Doi et al. | 328/128 |

OTHER PUBLICATIONS

Isys, a Cognex Company, iLearn Classifier, Technical Product Bulletin.

*Primary Examiner*—Robert W. Downs
*Assistant Examiner*—Sanjiv Shah
*Attorney, Agent, or Firm*—Theresa A. Lober

[57] ABSTRACT

An improved classification system for classifying characteristics of an article into classes of characteristics based on features associated with the characteristics. The system includes a first rule-based classifier that provides rules that embody requirements of selected features so as to together define selected classes. These rules are applied to measured features of an article characteristic to assign one of the selected classes to that characteristic, should the article characteristic meet the feature requirements of one of the selected classes. The system also includes a trainable classifier configured based on a training set of preclassified characteristics, with the trainable classifier connected so as to accept from the first rule-based classifier an article characteristic not classified by the rule based classifier. The trainable classifier assigns one of the training set classes to the unclassified characteristic, should the trainable classifier configuration associate that characteristic with one of the training set classes. A second rule-based classifier can be connected so as to accept classified characteristics from the trainable classifier for making refinement classifications, and a third rule-based classifier can be connected so as to accept unclassified characteristics from the trainable classifier for making classification based on selected classes.

23 Claims, 6 Drawing Sheets

AUTOMATIC CLASSIFIER FOR REAL TIME INSPECTION AND CLASSIFICATION

BACKGROUND OF THE INVENTION

This invention relates to techniques for inspecting and classifying images, and more particularly relates to automated classification techniques that enable real time classification of images.

In many operations such as manufacturing processes, it is desirable to inspect images of articles as the articles move through a sequence of operations to ascertain if the articles meet quality criteria or contain unwanted defects that require special processing. For example, during a process for continuous casting of steel, it is preferable to inspect a continuous steel ribbon or cut strips of the ribbon in real time as they pass between heating and cooling chambers, whereby ribbon sections or strips found to meet quality criteria can be immediately directed to a next process, e.g., rolling, without loss of time and without a change in steel temperature. Similarly, processes for producing sheets of paper, plastic, or other such "web" materials gain benefits in efficiency from real time quality inspection of the materials during the manufacturing process; and in general, a wide range of manufacturing and processing operations optimally include provisions for real time inspection of articles during their manufacture.

Inspection for minimum manufacturing quality criteria is typically preferably based on classification of aspects of articles such as, e.g., defects of the articles, as a function of, e.g., defect type and severity. In such a defect classification technique, in the case of a web material, for example, defects of the material are identified in images of the material and measurements, i.e., features, of the defects are extracted from the images. The defects are then typically classified into categories, or classes, such as "scratch," "oil spot," "dirt," "roll mark," or other named defects, as well as subcategories, or subclasses, such as "small scratch," or "large scratch."

Conventional systems for real time inspection and classification, used, e.g., for quality control inspection, typically are implemented as a rule-based, look-up-table classifier configuration in which feature measurements such as defect feature measurements are compared with pre-specified table rules for making classification decisions. For example, Fant et al., in U.S. Pat. No. 4,519,041, describe a rule-based defect classification system employing hierarchical rule-based classification logic in combination with syntactic/semantic classification logic to make classification decisions. Rule-based systems like this generally employ classifier tables that include a set of logical or numerical tests for making the comparison between measured feature values and predefined test feature values or test feature value thresholds.

Generally, to implement a rule-based classification system, a system user must manually determine, through observation, which features are important for defining each of the classification categories of interest. In the case of a material manufacturing process, this can be a complex procedure that requires a skilled engineer or technician who has familiarity both with, e.g., defects of interest to be classified for a given material, as well as a good working knowledge of statistics and mathematics. The complexity of this procedure is compounded by the fact that frequently, a given manufacturing plant has a unique language and folklore for describing and classifying defects, because the nature of defects inherently depends heavily on characteristics of a particular material being manufactured, the process sequence being followed, and the particular equipment being used. Further, machine operators of a given plant frequently prefer definition of more than a general defect class; for example, they may prefer to have a severity index unique to a given operation assigned to classified defects so that appropriate plant personnel can be alerted immediately when a "killer" defect appears and so that they are not bothered by "nuisance" defects that have no real adverse affect on the manufactured product.

But even within a given manufacturing plant or process sequence, a wide variety of materials and types of material defects may be critically important, and a single rule-based classification system is typically responsible for all such materials and characteristic defects. This requires that the classification system be configured with a capability to generate a large number of defined defect features such that optimum classification across the variety of materials and defect classes is ensured. As a result, configuring a rule-based classification system for a given material can be complex in that the system operator typically must select those features that are preferred for a given material inspection process from a substantial amount of defect feature data generated by the system. Thus, while the structure of a rule-based classifier table is generally considered easy to implement and use, the development of an optimum table for a given classification operation is in practice often an unachievable goal.

Indeed, experience in the field of real time material defect classification has shown that very few manufacturing process users of rule-based classification systems have the ability to properly define an optimum, complete set of rule-based table rules for a given material manufacturing operation, and thus, rule-based classification systems generally do not in practice achieve desired levels of classification accuracy. Further, the binary nature of rule-based decisions as implemented in a rule-based classifier often give rise to poor classification repeatability because feature measurement data is subject to quantization errors. The binary nature of rule-based decision making is not flexible because test feature values in a rule-based table are fixed, and thus a rule-based test of a feature results in an a priori classification decision even if a measured feature value and a test feature value differ by as little as, e.g., 1 percent or less. In addition, the performance of rule-based classification systems depends strongly on which test feature values were selected during development of the rule-based table.

Trainable pattern classifiers have been developed which overcome some of the problems of rule-based classifiers mentioned above, in particular by providing the ability to achieve relatively more reliable classification without the need for highly skilled personnel to develop an optimized classification table. This is enabled by the characteristic of trainable pattern classifiers to have an ability to "learn" from a set of training samples, which are articles of known classes, how to make classification decisions based on test features of articles under inspection.

Trainable pattern classifiers are, however, limited in their initial classification capabilities in that until a trainable classifier has been presented with a large number of training samples that cover the full range of possible features for a set of classes of interest, a trainable classifier cannot make effective classification decisions. Thus, the optimum training sample set for each intended class must not only be large, but also well-representative of the extent of the class; presentation to a trainable classifier of even thousands of training samples will not be effective if the samples are similar—a wide range of samples for each class must instead be provided. This is in part because the use of relatively non-unique samples, i.e., samples having features that do not well-distinguish between the boundaries of different classes, can seriously degrade classification results.

Trainable classifiers generally are also distinguished over rule-based classifiers in that trainable classifiers can be configured to regard selected possible classes, e.g., defect classes, as being more critical than others. For example, a trainable classifier can generally be configured such that in selecting between a first class assignment or second class assignment for a given defect the classifier will give priority to, say, the first class, based on, e.g., a loss value prespecified for each class and factored into the classification assignment result. While such selectivity is generally quite important for a manufacturing process, the task of implementing its configuration can be quite complicated, based on particular prespecified dependencies of the loss value, and this complexity often precludes its implementation.

Even without the implementation of this particular trainable classifier configuration, a great deal of time is typically required to identify and gather an optimum set of training samples characteristic of a given manufacturing process and materials to be inspected in general. When such a training set has been accumulated, the training process during which the samples are "taught" to the system can require many hours or even days. This heavy training requirement and the complicated system configuration requirements are not generally reasonable in the fast-paced environment of a manufacturing process.

PROBLEMS TO BE SOLVED BY THE INVENTION

It is a goal of the present invention to overcome the drawbacks of the existing rule-based and trainable classification systems by exploiting the strengths of both rule-based and trainable classification systems while at the same time compensating for their respective weaknesses. It is a further goal of the invention to provide a classification system that is automatic and that operates in real time, at high speed. It is a further goal of the invention to provide a classification system that enables ease of system configuration as well as superior classification reliability.

SUMMARY OF THE INVENTION

The invention provides an improved classification system for classifying characteristics of an article into classes of characteristics based on features associated with the characteristics. The system includes a first rule-based classifier that provides rules that embody requirements of selected features so as to together define selected classes. These rules are applied to measured features of an article characteristic to assign one of the selected classes to that characteristic, should the article characteristic meet the feature requirements of one of the selected classes. The system also includes a trainable classifier configured based on a training set of preclassified characteristics, with the trainable classifier connected so as to accept from the first rule-based classifier an article characteristic not classified by the rule based classifier. The trainable classifier assigns one of the training set classes to the unclassified characteristic, should the trainable classifier configuration associate that characteristic with one of the training set classes.

This classification system of the invention takes advantages of the performance strengths of each of the rule-based and trainable classifiers, while at the same time minimizing their drawbacks, to provide a classifier that is superior over both conventional rule-based classifiers and trainable classifiers. The classifier system of the invention provides reliable and efficient classification with an elegant configuration that enables efficient classification processes.

In embodiments provided by the invention, the classifier system further includes a second rule-based classifier connected so as to accept from the trainable classifier a classified article characteristic for refining classification of that characteristic. The second rule-based classifier provides refinement rules that embody requirements of selected refinement features so as to define refinement classes. The refinement rules are applied to measured features of the classified article characteristic to assign one of the refinement classes to the classified characteristic, should the classified characteristic meet the refinement feature requirements of one of the refinement classes.

The classifier system further is provided by the invention to include a third rule-based classifier connected so as to accept from the trainable classifier an article characteristic not classified by the trainable classifier or the first rule-based classifier. This third rule-based classifier provides rules that embody requirements of selected features so as to together define selected classes. The rules are applied to measured features of the unclassified article characteristic for assigning one of the selected classes to the unclassified characteristic, should the unclassified characteristic meet the feature requirements of one of the selected classes.

Here the selected classes defined by rules of the first rule-based classifier can include those classes expected to be frequently assigned to article characteristics of interest and those classes for which assignment to characteristics of interest, based on rigid feature requirements, is expected to be accomplished with at least a minimum prespecified level of confidence.

In a further embodiment, the classifier system of the invention is configured such that the trainable classifier first assigns one of the training set classes to an article characteristic, should the trainable classifier configuration associate that characteristic with one of the training set classes, and a first rule-based classifier is connected so as to accept from the trainable classifier a classified article characteristic for refining classification of that characteristic based on refinement rules that embody selected refinement features. Here a second rule-based classifier can be connected so as to accept from the trainable classifier an article characteristic not classified by the trainable classifier, for assigning one of the selected classes to the unclassified characteristic, should the article characteristic meet the feature requirements of one of the selected classes.

In a further aspect of the invention, there is enabled the ability to choose features of the preclassified characteristic training set of the training based classifier based on a comparison of percentage of training set characteristics that are associated by the trainable classifier with the class known to be correct for each respective training set characteristic. This comparison is carried out as each possible feature is added to a set of possible features, with each feature being added in an order beginning with a feature known to provide a highest degree of correctness in association by the trainable classifier with the characteristic training set, based on that feature. Any possible feature for which comparison of the association percentage of the training set using a current feature accumulation in the set of possible features is less than an association percentage for a just preceding feature accumulation in the set being is indicated as not to be chosen as a feature of the preclassified characteristic training set.

In other embodiments, the invention provides the ability to generate measured features of article characteristics to be classified, as well as providing the ability to acquire characteristic information from an article to be examined, for generating the measured features.

In other embodiments, the rules provided by the first rule-based classifier are configured as a classification table, with each classification table row corresponding to a selected class and each column of a given class row corresponding to a feature requirement for that class. A plurality of rules provided by the rule-based classifier that is connected so as to accept from the trainable classifier an unclassified article characteristic relate in one embodiment to a prespecified minimum degree of confidence of classification assignment by the trainable classifier. One degree of confidence is provided for each of a corresponding plurality of selected classes, and a corresponding minimum degree of confidence is required for assignment of a given one of the plurality of selected classes to the unclassified article characteristic.

In further embodiments, the trainable classifier is configured based on probability functions that are constructed based on probability of association by the trainable classifier of each characteristic of the preclassified characteristic training set with a corresponding known respective class for that characteristic. Here, at least one feature of characteristics in the training set can be weighted for each class in the training set as a function of degree of criticality of that feature in correct association of a characteristic with that class.

In other aspects of the invention the refinement characteristic classes can include characteristic subclasses of at least one training set class of the trainable classifier; can include classes defined by confirmational feature requirements for confirming validity of trainable classifier class associations; and can include classes defined by clarification feature requirements for clarifying a trainable classifier class association between two classes for which confusion between the two classes is possible.

In other aspects, the rules provided by the rule-based classifier that is connected so as to accept an unclassified article from the trainable classifier can be configured as a classification table, with each classification table row corresponding to a selected class and each column of a given class row corresponding to a feature requirement for that class, with the classes selected for enabling classification of article characteristics undefined by another classifier in the classification system.

The classifier system of the invention can be employed in a wide range of classification applications for which characteristics of an article or articles are to be classified. Characteristics of continuous articles, e.g., web materials like steel strips, of discrete articles, e.g., discrete products, of portions of articles, of entire articles, or of data representative of an article, can be classified by the classifier system of the invention.

Further applications, features, and advantages of the invention will be apparent from the claims, and from the following description and accompanying figures.

DETAILED DESCRIPTION OF THE INVENTION

Figure 1A:
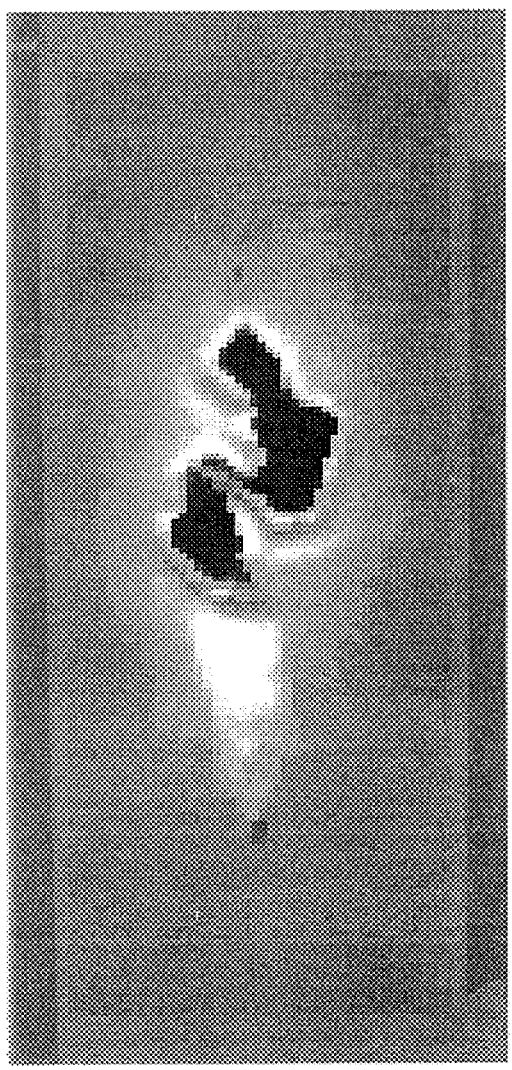
FIGS. 1A–B are grayscale images of two different defects together characteristic of a "hole" defect class.
Figure 1B:
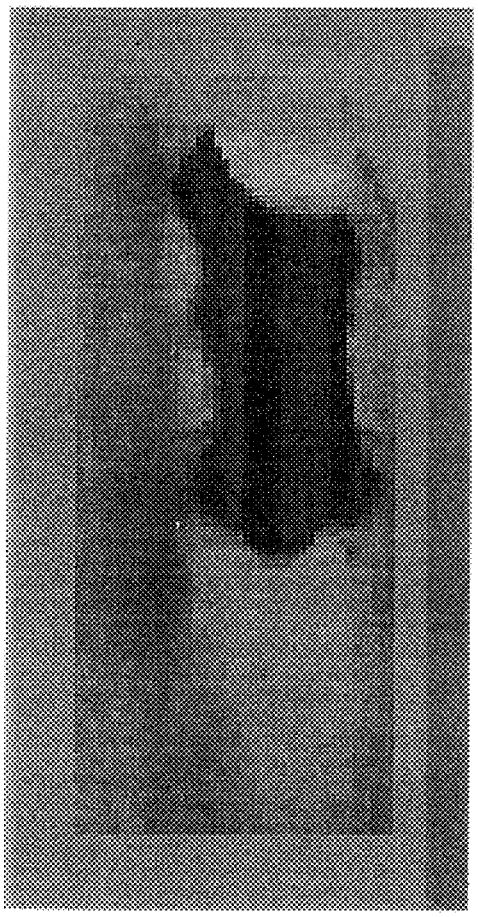

The problem of automatic inspection and classification of characteristics in an image of an article, such as classification of material defects in an image of the material, is known to be quite difficult. Consider, for example, the classification of defects of a steel strip surface. FIGS. 1A and 1B present two gray-scale images of steel surface defects. Each of these defect images is that of a hole and both would preferably be classified as a hole during a classification process. But it is readily apparent that the two hole defects look very different. Specifically, there is no image transformation, e.g., scaling, rotation, or gray-level shifting, that can transform the hole image in FIG. 1A into the hole image in FIG. 1B. In other words, it is not possible to create a template for the class of defects called "hole" that could encompass both the defects in FIGS. 1A–1B.

In the invention, classification of characteristics of articles is made based on characteristics' features, e.g., in the steel defect example above, is made based on defect features, rather than raw digitized defect images, to enable automatic classification of a broad range of defect types and severities. Features are here meant as aspects of an article characteristic, e.g., aspects of defects in an image of a material, that are computed based on measurements extracted from the image. Each component of the apparatus and method provided by the invention for analyzing features to automatically classify characteristics in real time will be described in detail below.

Figure 2:
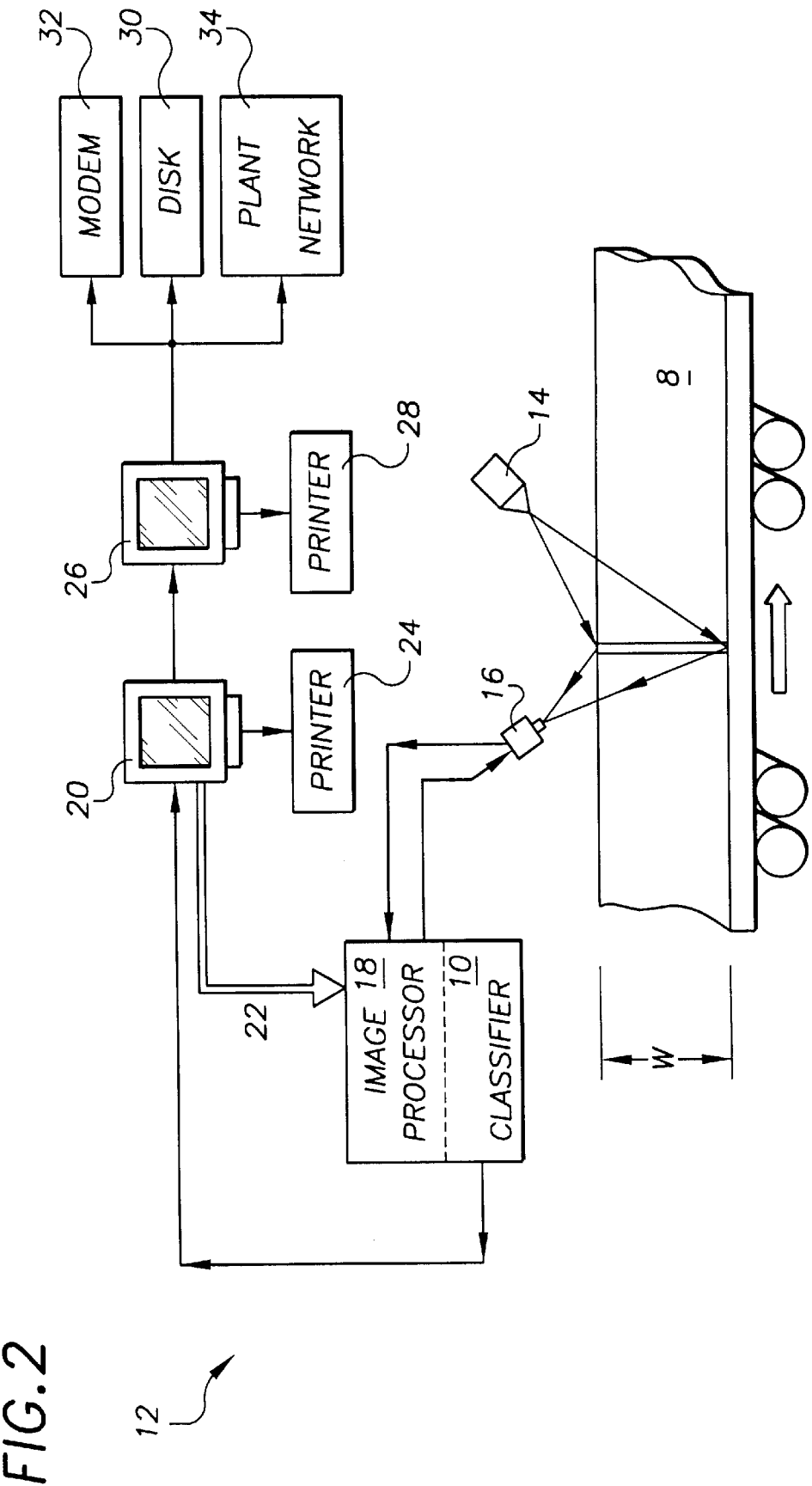
FIG. 2 is a schematic diagram of an inspection system in which the classifier of the invention is configured for inspecting a moving material in a manufacturing process and classifying defects of the material in real time.

Referring to FIG. 2, in accordance with the present invention there is shown an example manufacturing process in which the classification technique of the invention can be employed. In the example process, a material, e.g., a steel strip 8, being rolled along a manufacturing sequence from left to right, is automatically inspected for defects, which are automatically classified by the classifier system 10 of the invention configured in an inspection system 12. At least one light source 14 is mounted to aim at the rolling strip 8 for directing a beam of light across the width, W, of the strip 8, thereby creating a light stripe on the steel for inspection. One or more cameras 16 are positioned to capture light reflected from the surface of the web along the light stripe to produce a linescan image of the web surface in the light stripe. The camera captures successive linescan images as the web moves beneath the camera.

As the camera captures linescans, images of the steel strip are transferred from the camera to an image processor 18, which also sends control signals back to the camera. The image processor extracts information from the image about objects in the image that could represent defects of the steel strip, specifically extracting numeric features of the objects for use in classifying the objects as defects. "Object" is here intended to refer to distinguishable characteristics, in this example case defects, found in the image and for which classification is desired. The potential defects identified in the image are then classified by the classifier 10 of the invention based on these features.

As explained in detail below, the classifier 10 of the invention provides superior classification performance with an automated classification process that can operate at real time speeds commensurate with, e.g., the speed with which the steel strip is being moved. Specific details of the classifier operation will be provided later in the discussion.

Defect classification information is output from the classifier and can be transferred from the classifier to any number of user-defined peripheral equipment for analysis of the classification information. For example, the classification information can be transferred to a computer, to a workstation 20, or to other suitable computer processor that enables operator configuration and control 22 of the classification process. In addition, a manufacturing controller connected with the manufacturing process, or other controller, can be interfaced with the inspection system to synchronize inspection and classification process timing with that of the manufacturing process flow. The workstation 20 can be provided with software for viewing the classification results on the workstation display as the inspection takes place; e.g., information about the number, type, and location of defects can be displayed. A printer 24 connected to the workstation 20 can also be used to print out defect data. A workstation operator can then use this information to, e.g., modify the production process or remove material that does not meet quality requirements.

An additional one or more computer processors such as workstations 26 can further be provided for offline review and/or printing, via a printer 28, of defect data. The data can also be stored, e.g., on a disk storage unit 30, sent to a remote location by way of a modem 32, transferred through a manufacturing plant network 34 such as a local area network to other manufacturing operators, or otherwise delivered and/or manipulated for analysis and control of the manufacturing process.

As can be recognized, the automated steel inspection system described above is but one example of a wide range of machine vision systems, and more broadly, classification systems, in which the classifier of the invention can be configured for enabling real time, automatic classification. In general, the classifier of the invention requires only that a machine vision system or other data acquisition system in which the classifier is to be configured be capable of producing numeric feature information describing characteristics of articles for which classification is desired.

Aside from aspects of continuous articles such as web materials like the steel strips described above, aspects of discrete articles, such as products, e.g., computer disks, plastic components, or indeed any other discrete articles for which feature information can be acquired and analyzed, can be classified by the classifier of the invention. For example, in the case of a machine vision system, images of entire discrete articles can be captured using, e.g., an area camera in a frame grabber configuration, as is conventional, or for larger articles, an image of an article portion or portions of interest can be captured.

It is thus seen that the classifier of the invention is not limited to a particular type or size of article for which classification is desired, and indeed can be implemented for classification not only of articles but also of image data such as text and graphics data acquired from a document of interest and stored in computer memory. Likewise, characteristics of images of articles, data, or patterns representative of a process, acquired from a video sequence or other image acquisition technique, can be classified using the classifier of the invention.

Figure 3:
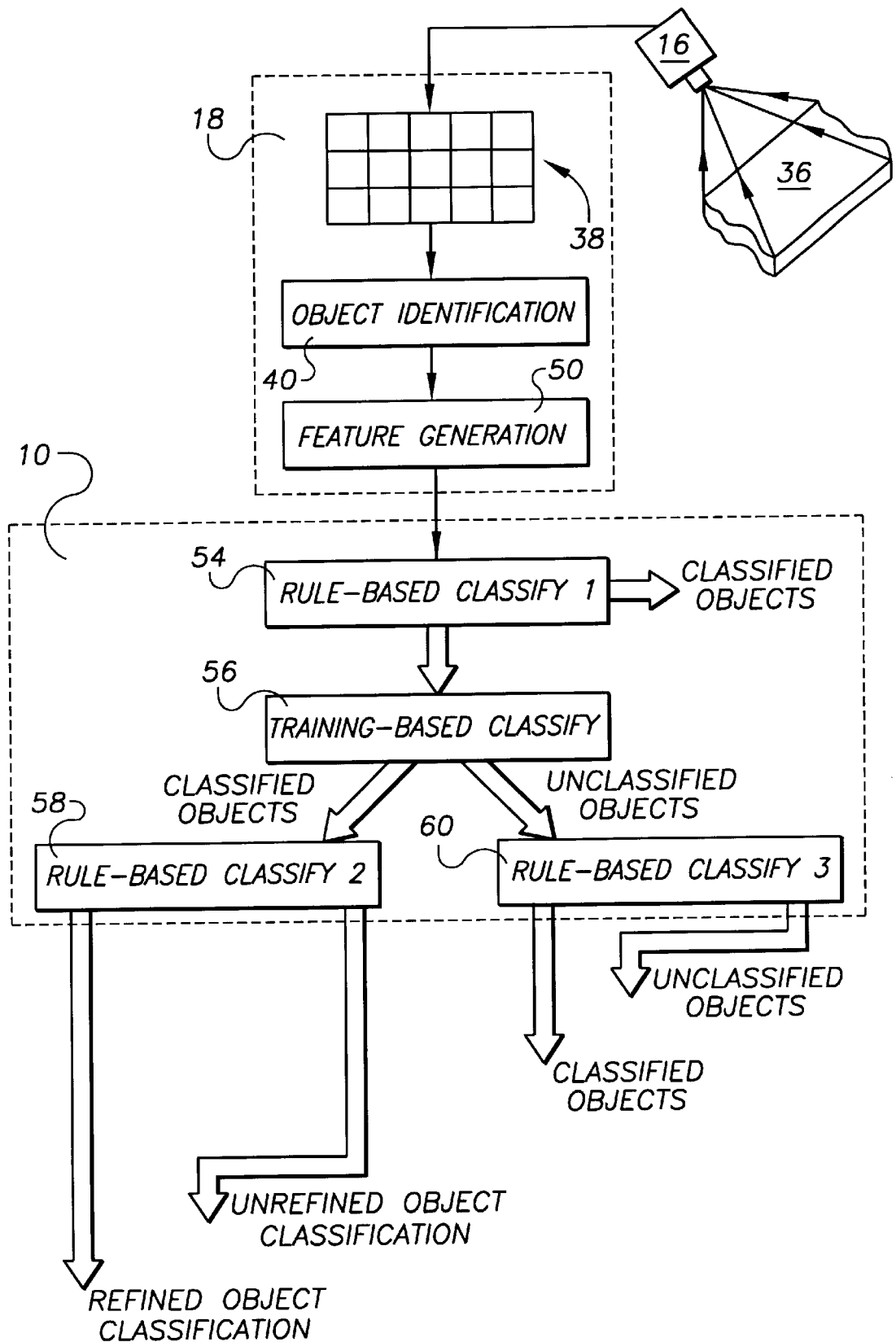
FIG. 3 is a block diagram of an inspection system and an accompanying classification system in accordance with the invention.

In addition, non-optical information, such as information relating to aspects of a manufacturing process during which articles are being inspected and classified, can be used as input feature information for the classification process. Such information can be generated by, e.g., thermal sensors, moisture sensors, electromagnetic sensors, gauge, width, and density measurement devices, or other such sensing devices. Other process-related data produced by a process-control computer could also be employed as feature information. As can be recognized, beyond information relating to manufacturing processing, a wide range of non-optical feature information can be employed as feature information in the classification process, with suitable feature extraction modes employed to produce such information Referring to FIG. 3, a selected mode of feature extraction, e.g., image capture, as well as a selected inspection and classification application, determines the specific acquisition and processing functions to be performed prior to classification of characteristics of interest for that application. Considering an image capture system for optical feature extraction, and as shown in the figure, an image of all or a portion of an article 36, captured by a camera 16 suitable for the characteristics of the article of interest, is input to the image processor 18 (see also FIG. 2) for extracting information about the article image to be used in a classification process in accordance with the invention.

As can be recognized, conventional camera systems, e.g., video cameras such as charge-coupled device (CCD) cameras, or other suitable image acquisition systems, e.g., laser scanners, can be employed in acquiring an article image. Preferably, the camera system selected can acquire an image at a rate commensurate with the speed of, e.g., a manufacturing line under inspection or in general, the desired real time inspection and classification speed.

The image processor 18 accepts the image signal produced by the camera and produces a corresponding digital image pixel array 38, which can consist of, e.g., one or more rows of pixels, as is conventional, each of a digital image intensity value and that together are representative of, e.g., a grayscale or color version of the acquired image. Then, as is conventional, the image processor analyzes the pixel value data to identify 40 objects in the acquired image and to generate 50 feature information for the identified objects. "Object" is here intended to refer to distinguishable characteristics found in the image and for which classification is desired. Identification of objects in the image can be accomplished by any of a wide range of well-known and conventional image processing techniques, including, e.g., pixel value normalization, pixel value thresholding such as level or edge thresholding, pixel value filtering and/or merging, or other image processing techniques.

Preferably, the result of the image processing, whatever its implementation, is generation of features, for objects identified in the image, that are sufficiently descriptive of classes of interest of the objects, e.g., classes of defects, such that differentiation between classes can be accomplished by the classifier. But because, as explained earlier, various classification applications rely on various features, it is often difficult to determine a priori for a given classification operation which features of a set of features will be important for that application. Thus, in accordance with the invention, it is preferred that if a single implementation of the classifier of the invention is to be used for various classification applications, then the image processor with which the classifier is configured should be capable of generating a wide variety of features, whereby reliable classification in all of the various applications is ensured.

Figure 4A:
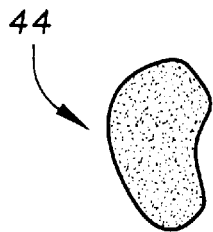
FIGS. 4A–C are schematic representations of a defect image, an overlay of a pixel array on the defect image, and a pixel-based representation of the defect image bounded by an object bounding box, respectively.
Figure 4B:
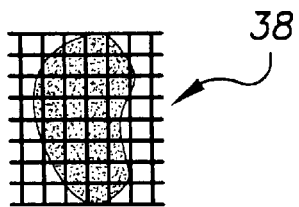
Figure 4C:
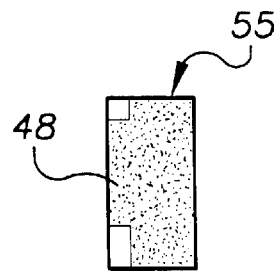

Feature information can be generated by the image processor using software, special purpose hardware, or other processing configuration, based on speed requirements for a selected system implementation. Whatever the implementation, the feature generation process is accomplished to derive positional, shape, size, and optical characteristic measurements for objects identified by the image processor. In some applications, it can be preferable to facilitate such measurements by producing coordinates for defining a bounding box that is the smallest rectangle possible which can completely enclose all pixels associated with a single identified object. Based on this operation, and referring to FIG. 4A, an object image 44, represented by a pixel array 38 (in an idealized manner in FIG. 4B), is defined by the image processor as an object image 48 having a bounding box 55 outlying its periphery.

With bounding boxes defined for identified objects, positional, shape, and size feature measurements can then be readily derived by examination of the extent of the pixels representing the bounded object. Beyond positional features, other features relating to optical characteristics of the identified objects can additionally be generated based on the grayscale values of pixels associated with the objects. Features relating to "moments" of an object, by regarding pixel gray levels as the object "mass," can also be generated. As can be recognized, other types of features can additionally be generated, for example, frequency of object occurrence, conditions of an imaged article in the vicinity of an identified object, or other such features.

Feature measurements can be, e.g., boolean, having only the logical values of "true" or "false" assigned to them, or can be, e.g., numeric. Numeric feature values are generally stored as floating point numbers, as they may require a decimal point, and boolean features can be represented internally as a "1," or "0," for example. Table I below lists and describes example features to be generated by the image processor for use with the classifier of the invention in a material defect classification application.

TABLE I

| Feature | Feature Definition |
|---|---|
| Box Left | The cross-web (X-orientation) distance from a fixed measuring point to the left side of the bounding box. |
| Box Right | The cross-web distance from a fixed measuring point to the right side of the bounding box. |
| Box Top | The down-web distance from the start of inspection to the top of the bounding box. |
| Box Bottom | The down-web distance from the start of inspection to the bottom of the bounding box. |
| Box X Center | The cross-web distance from a fixed measuring point to the center of the bounding box. |
| Box Y Center | The down-web distance from the start of inspection to the center of the bounding box. |
| Box Left from Left Edge | The cross-web position from the left edge of the inspected material to the left side of the bounding box. |
| Box Left from Right Edge | The cross-web position from the right edge of the inspected material to the left side of the bounding box. |
| Box Right from Left Edge | The cross-web position from the left edge of the inspected material to the right side of the bounding box. |
| Box Right from Right Edge | The cross-web position from the right edge of the inspected material to the right side of the bounding box. |
| Box X Center from Left Edge | The cross-web position from the left edge of the inspected material to the center of the bounding box. |
| Box X Center | The cross-web position from the right edge of the |

TABLE I-continued

| Feature | Feature Definition |
|---|---|
| from Right Edge | inspected material to the center of the bounding box. |
| Box Height | The height of the bounding box. |
| Box Width | The width of the bounding box. |
| Box Area | Box Width * Box Height. |
| Box Perimeter | (2 * Box Height) + (2 * Box Width). |
| Total Area | The area of the thresholded pixels in the object. That is, the number of thresholded pixels in the object, scaled by the pixel resolution. |
| Perimeter | The perimeter of the object. |
| Height/Width Ratio | Box Height / Box Width. |
| Area Ratio | Total Area / Box Area |
| Perimeter Ratio | Perimeter / Box Perimeter. |
| Low Grayscale | The grayscale value of the darkest thresholded pixel in the object. |
| High Grayscale | The grayscale value of the lightest thresholded pixel in the object. |
| Average Grayscale | The average grayscale intensity of the thresholded pixels of the object. |
| Grayscale Range | High Grayscale - Low Grayscale |
| Repeating Defect | Boolean feature indicating a series of similar defects recurring at a regular interval. |

The above descriptions of features to be generated by the image processor are examples of features for use in a defect classification application and are meant as a representative, but not complete, list of possible features for use in classification processes in general in accordance with the invention. As can be recognized, there is no limit to the number and type of features that may be useful in the wide range of classification applications to which the invention is directed. The features described above provide an example of the range of types of features that are important for enabling efficient and reliable classification in one classification example. Indeed, as explained previously, a wide range of non-optical features can be employed, and no specific mode of feature extraction is required.

Referring again to FIG. 3, after features have been generated 50 by the image processor 18, the classifier 10 of the invention is invoked to classify the identified objects based on the feature information for those objects. The classifier 10 includes four classifier modules, namely a first rule-based classifier 54, hereinafter called RBC1; a training-based classifier 56, hereinafter called TBC; a second rule-based classifier 58, hereinafter called RBC2; and a third rule-based classifier 60, hereinafter called RBC3.

In accordance with the invention, the configuration of these four classifier modules together as a classifier is flexible; specifically, the modules selected to be included in the classifier and the object features analyzed by each selected module can be reconfigured over time. This configuration flexibility is provided to exploit the implementation and performance advantages of each module while at the same time compensating for the complexity and performance weaknesses of the various modules.

All three rule-based classifier modules, RBC1, RBC2, and RBC3, can be implemented based on any of a wide range of classification configurations that make classification decisions based on defined rules. In one example configuration in accordance with the invention, the rule-based modules embody classification tables, with each row of a given module's classification table being assigned to a given class, e.g., in the case of defect classification, a defect class called "scratch." The columns of a class row of the table specify for that class various limits on features characteristic of that class that in the classification operation are compared with corresponding measured features of an object under consideration; for example, a feature test of "minimum bounding box height" is an example rule-based feature test to be applied to an object under consideration. An object is determined to belong to a class assigned to a given row of the table if the measured object features meet each of the feature limits in the columns of the class row.

In this classification table implementation, each rule-based table classifier module classifies an object based on classification rules specific to that module by stepping through the classification table implemented in that module. Beginning with the first class row of the table, the module compares measured feature information called for in each of the columns of the row with the specified feature limits, one column at a time. Upon reaching a first column feature specification that the object under consideration fails to meet, e.g., by having less than a minimum required bounding box height, it is assumed that the object does not belong to the class for that table row; the rest of the columns of that row are then skipped over and the classification process continues at the next row of the table. Upon the first occurrence of passing all required feature specification tests of a given row, the class for that table row is assigned to the object and the classification is completed for the rule-based classifier. If upon reaching the end of the table, i.e., after all class rows have been addressed, no class has been assigned, then the object is indicated to be unclassified.

As can be recognized, many implementations alternative to this table-based implementation for the rule-based classifiers are suitable. As the functionality and interrelationship of the classifier modules is discussed in detail below, considerations for such alternatives will be provided.

The training-based classifier module of the classifier is not based on an a priori, user-configured rule implementation, and instead is an automatic classifier that makes classification decisions based on its previous training. The training-based classifier can be implemented as any of a wide range of automatic, trainable classifiers based, e.g., on probabilistic functions, interconnected neuron functions in a neural network, automatically-generated rules, or other suitable automatic classifier configuration.

In one example in accordance with the invention, the training-based classifier module is implemented as a set of class probability functions that are based on a training set of classes for which the classifier is said to be "trained" prior to the classification operation. Each class probability function defines, for a given class, the probability of an object belonging to that class as a function of the probabilities of various object features selected to represent the class. As explained in detail below, the training process develops the probabilities of a given feature being associated with each class of the training class set. These feature probabilities are then employed during the classification process to associate an object with one of the classes by ascertaining the probabilities of the object belonging to each of the training set classes based on the features of the object, with the class to which the object has a highest probability of belonging then being assigned to the object by the classification operation.

As discussed in the background section, both user-configured rule-based classifiers and automatic, training-based classifiers have particular advantages and weaknesses. These advantages and weaknesses are tied to the implementation and operation of the classifiers. User-configured rule-based classifiers are relatively uncomplicated to implement in that specific feature limitations for classes of interest need only be defined and formatted into a desired classification table structure to enable a classification process. However, in practice, the actual implementation of the classification table is often time consuming and difficult. A further weakness of rule-based classifiers stems from the binary nature of the feature test limitations used in a rule-based table. Because the feature test limitations set specific, hard, limits, they cannot accommodate decision flexibility; in other words, even a very slight variance of an object feature from, e.g., a specified feature measurement range, results in a negative comparison with that feature measurement range. The rule-based classifiers are thus not responsive to even very slight distinctions between a test and measured feature. Digital quantization errors in image data acquired during the inspection process accordingly cannot be accommodated and can result in erroneous rule-based classification results.

Automatic, trainable classifiers that are not rule-based are in contrast flexible by nature in that they can accommodate feature deviations since they do not make rigid decisions based on a defined feature limitation or range. Because rule-based automatic classifiers are similar to user-configured rule-based classifiers in that they both are generally characterized as inflexible in their classification decision process, rule-based automatic classifiers are not generally preferred in the invention but can be employed where suitable. In one example in accordance with the invention of a trainable classifier that is not rule-based, a probabilistic training-based classifier is employed to associate an object with a class by assigning a probability of likeness between test features and measured features for every possible class to ascertain a highest classification probability, rather than making a binary, rule-based classification decision feature by feature. This flexibility comes at the cost, however, of the need for an extended sample set for classification training.

The inventors herein have recognized that the advantages and weaknesses of user-configured, rule-based classifiers and automatic, training-based classifiers are complementary, and based on this recognition have structured the configuration of the classifier of the invention to exploit the advantages of the various classifier modules while at the same time minimizing their drawbacks, to provide a classifier that is superior over both conventional trainable and user-configured rule-based classifier systems. In the invention, each class in the set of possible object classes is relegated to a given one or more of the classifier modules based on aspects of that class and the classification process of each of the modules. Over time, as the classifier system is used to classify objects, the classifier modules can be reconfigured and one or more classes originally handled by a given first classifier module migrated or additionally delegated for handling by a second of the modules.

Figure 5A:
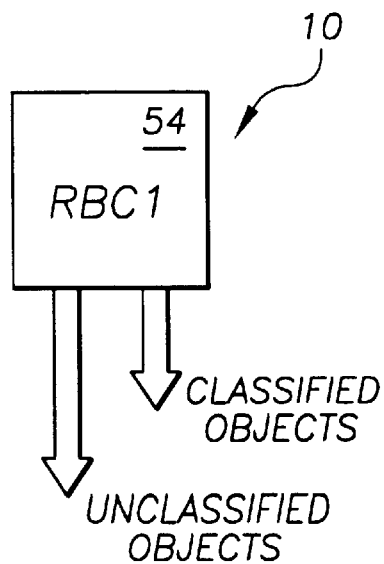
FIGS. 5A–C are block diagrams of three classifier configurations provided in accordance with the invention.

In one example scenario in accordance with the invention, referring to FIG. 5A, the classifier 10 of the invention is originally configured using only RBC1 54 to classify objects. The RBC1 classifies objects input to it, and outputs the objects with assigned classes or with an indication of no classification. Preferably, the classifier of the invention is implemented with an initial, basic RBC1 configuration that enables some degree of classification without the need for any required operator configuration. For example, a basic rule-based table classifier can be provided that distinguishes between several important classes for a variety of applications.

In an example RBC1 set-up classification table provided by the system for material defect classification, defects are classified based on limitations for features including total area, low grayscale, high grayscale, and height/width ratio. Table II below lists this example set-up classification table for RBC1.

TABLE II

| Defect Class | Area (sq. mm) | Minimum Grayscale | Maximum Grayscale | Height/Width Ratio |
| --- | --- | --- | --- | --- |
| Tiny & dark | <3 | | <128 | |
| Tiny & light | <3 | ≧128 | | |
| Small & dark | 4–9 | | <128 | |
| Small & light | 4–9 | ≧128 | | |
| long/thin/dark | | | <128 | >10 |
| long/thin/light | | ≧128 | | >10 |
| Medium & dark | 10–99 | | <128 | |
| Medium & light | 10–99 | ≧128 | | |
| Large & dark | 100–999 | | <128 | |
| Large & light | 100–999 | ≧128 | | |
| Huge & dark | >1000 | | <128 | |
| Huge & light | >1000 | ≧128 | | |

As can be recognized, other rule classification tables, and other types of user-configured rule-based classifiers can be provided with the classifier system for initial use in the RBC1 module at the time of system initialization to eliminate the need for operator configuration.

After system initialization using a basic RBC1 classifier implementation provided by the system, the system user can modify the RBC1 implementation based on collected classification data. The collected data thereby enables the user to make informed decisions about what kinds of classes are important for a given application and what features are important for distinguishing between the classes of interest. The RBC1 implementation, e.g., as a rule classification table, is correspondingly refined to reflect the classification data as it is collected.

Figure 5B:
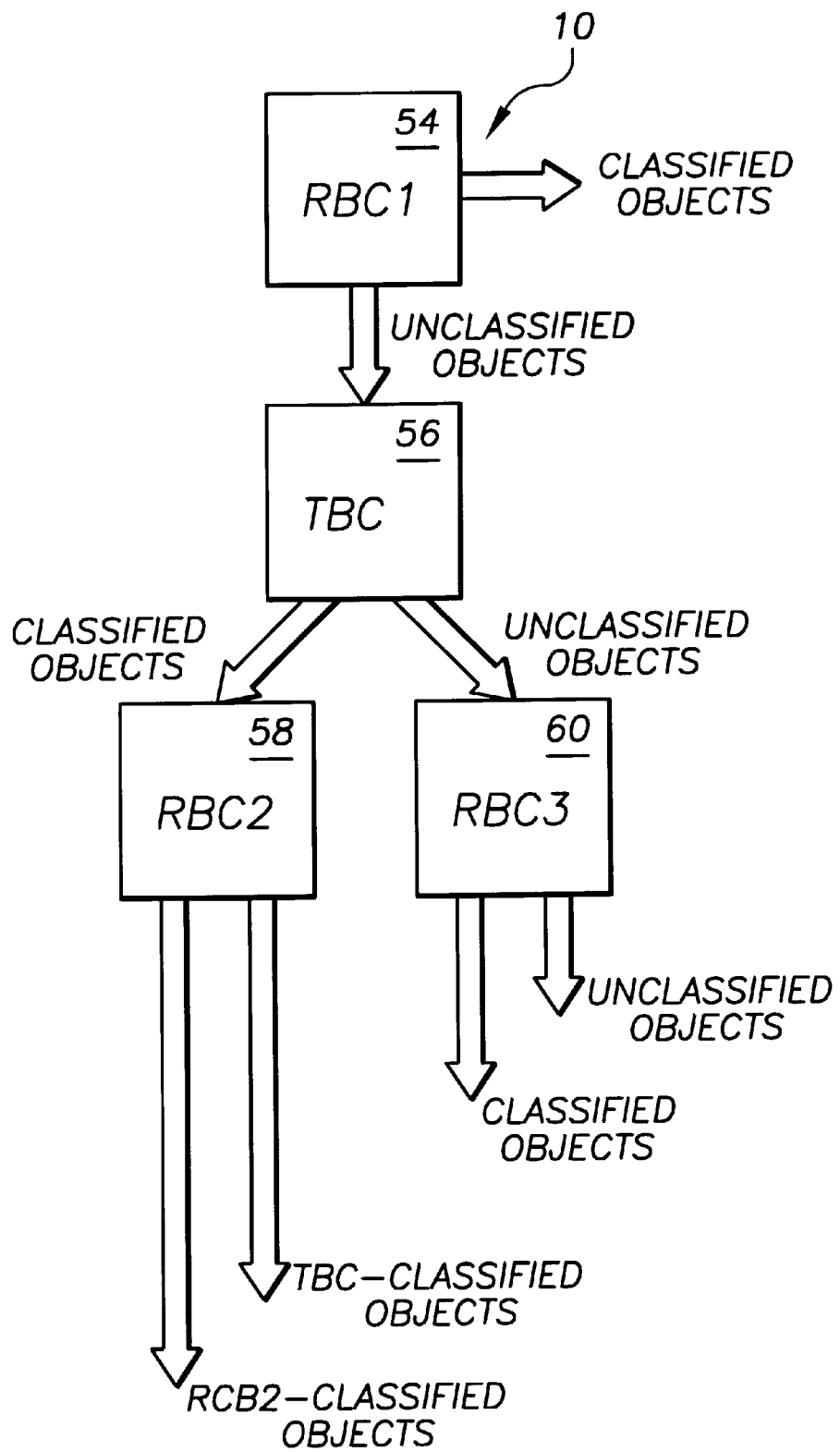

As use of the inspection and classification system of the invention continues, classification results can be stored for continual review and analysis by a system operator to augment the classes and features of the RBC1 rule-based classifier module. As operation continues, a sample set of object examples that have known classification assignments is preferably assembled by the system operator for training the training-based classifier TBC 56. When a reasonable number of such samples have been accumulated the classifier 10 can be reconfigured, as shown in FIG. 5B, to include all possible classifier modules; namely, the RBC1 54, the TBC 56, the RBC2 58, and the RBC3 60. This configuration is like that shown in FIG. 3.

This configuration enables classification in the following manner. Object classes, e.g., defect classes, for which a suitable number of feature samples have been accumulated, are used to train the TBC off-line with those samples, whereby the TBC is designated to analyze a object with respect to the corresponding trained sample classes, and the RBC1 is not employed for classification assignment of the classes included in the training set. However, the RBC1 implementation, not the TBC implementation, here preferably includes at least those classes that can be very easily recognized by the binary nature of the rule-based RBC1, such as edge defect classes and classes pertaining to specific material locations, e.g., a first few feet of material in a continuous roll of material. In addition, classes that can be defined by very specific geometric criteria, e.g., size requirements, are best handled by the RBC1. This is because RBC1 can very efficiently and effectively classify such objects. Further, classes that are expected to be commonly identified in a given application are also preferably here maintained in the RBC1, whereby the TBC processing power is economized for those classes that are more difficult to assign.

Accordingly, classes for which the binary nature of rule-based classification is less desirable are at this point relegated to the TBC for classification by the TBC. As indicated by the figure, objects that are not classified by the RBC1 are passed to the TBC for classification by this module. The TBC can also be implemented to duplicate one or more classes of the RBC1 for increasing classification reliability. As mentioned above, as a practical matter, relegation of classes to the TBC is accomplished by training the TBC with a corresponding training set for those classes.

The second rule-based classifier, RBC2, is here implemented to accept classified objects from the TBC for refining of the classification. In a first example classification refinement in accordance with the invention, the RBC2 is implemented with a classification table that defines subclasses of the main classes defined by the TBC, e.g., "long scratch," and "short scratch," both of the main class "scratch." Any objects whose assigned main class does not have defined subclasses in the RBC2 are output by the RBC2 with only the main class assigned by the TBC, while those objects for which refined subclassification is possible are output by the RBC2 with the corresponding subclassification.

The inventors herein have recognized that implementation of subclassification functionality in the RBC2, rather than in the TBC, is particularly efficient, in that it is more convenient to accumulate a training set for a main class, rather than subclasses. Accumulation of training sets for subclasses can be difficult because, e.g., the distinction between two subclasses is a subjective judgment of the system operator, and also because the system operator might misclassify objects based on fine subclass distinctions—for example, a given object might be thought of as "large" when reviewed among a group of relatively smaller objects, but thought of as "small" when reviewed among a group of relatively larger objects. Conversely, in the RBC2 implementation, a finely distinguishable subclass feature limit can be a priori set without bias from review of a particular sample group, and can be later easily adjusted as classification results suggest. This enables very effective yet uncomplicated subclass definition.

In a further example of classification refinement in accordance with the invention, the RBC2 classifier module can be configured to enable, in addition to subclassification, confirmation rules that can override a doubtful classification made by the TBC. Here the RBC2 implementation, e.g., a classifier look-up table (LUT) is implemented with table rows based on, e.g., "if/then" statements. For example, if an object classified by the TBC as belonging to the class "A" is known to just as likely instead belong to the class "B," then the RBC2 LUT can be implemented with a row that specifies a feature test which strongly suggests class "A." If the feature test is "passed," then the object is assigned to belong to class "A;" otherwise the object is assigned to belong to class "B." In addition, if the TBC is configured to provide to the RBC2 the probability associated with the class for which the object was assigned, the RBC2 can be configured to test the probability against a preset probability threshold, with class assignments having probabilities less than the threshold being invalidated, i.e., the object being indicated as unclassified. The RBC2 can here also be used for risk minimization by applying class-specific probability thresholds assigned on the basis of the criticality of that class. With this configuration, the flexible classification process of the TBC is augmented by the more rigid classification process of the RBC2 to definitively classify an object that is frequently misclassified.

The third rule-based classifier, RBC3, is here implemented to accept unclassified objects from the TBC for making classification decisions for those objects. In one example RBC3 implementation, those classes for which TBC classification is preferred but an adequate sample set is not yet accumulated are moved from the RBC1 to the RBC3. Because the TBC is more precise than a user-configured rule-based classifier in its classification decisions, it is preferable that the TBC first make classification decisions, with those objects not classified by the TBC then considered by a rule-based classifier such as the RBC3.

In a particularly advantageous implementation, the RBC3 can be configured to provide a converse functionality to the classification invalidation function of the RBC2. Specifically, if the TBC is configured to provide to the RBC3 one or more of the top class names and corresponding classification probabilities for an object that that was not classified by the TBC due to, e.g., the top class probabilities falling below a preset probability threshold, then the RBC3 can revisit the classification decision on a class by class basis. For example, a LUT configuration of the RBC3 can be implemented with a rule whereby for a TBC-unclassified object which has a specified top TBC class assignment and a specified minimum probability associated with that assignment, the unclassified object is assigned the top TBC class assignment. As can be recognized, this type of rule effectively enables application of class-specific probability thresholds to the TBC classification process; in general, only a single, universal probability threshold can be supplied by the TBC due to the nature of the TBC decision making process. The RBC3 thus enables consideration of the specific nature of each class, as it relates to a corresponding probability threshold known to be characteristic for that class, in a manner that cannot generally be accomplished by the TBC. Objects that are classified by the RBC3 are output with a corresponding classification, while objects that are not classified by the RBC3 are output with a corresponding indication.

With this overall classifier implementation, objects input to the RBC1 are analyzed with respect to the group of classes efficiently handled by a rule-based classifier, with those objects for which classification is here possible being output by the RBC1 with an assigned classification and those objects that remain unclassified being output to the TBC. The TBC then analyzes the remaining objects based on its training set, making very flexible and precise classification decisions. Those objects that are not classified by the TBC are output to the RBC3, which is implemented to include all classes not handled by the RBC1 and the TBC. RBC3 analyzes the remaining unclassified objects and outputs either a classification assignment or an indication of no classification to any of the objects it processes.

Objects that are classified by the TBC are output to the RBC2, which is implemented to make refined subclass decisions for the classified objects. As explained earlier, objects for which no subclass assignment is possible are output by RBC2 with their main class assignment from the TBC, while objects for which a subclass assignment was possible are output with an assignment of a refined class. This classifier configuration results in extremely efficient and fast classification that exploits the performance strengths of each of the classifier modules.

In one example implementation of this configuration, an array of feature values for an object is input to the RBC1, which outputs, for classified objects, a class number that is an index into an array of possible class names. A prespecified index, e.g., "0," is set to represent unclassified objects. The array of feature values for such unclassified objects is in turn passed to the TBC, which makes a classification decision for the objects and outputs a class number for TBC-made class assignments, and the index indicated for no classification for unclassified objects. The TBC also adds four values to the feature array, namely, the indexes of the two classes with highest probability for the object, and the value of each of the two probabilities. Objects that are unclassified by the TBC are passed to the RBC3, and objects that are classified are passed to the RBC2. The two highest class indexes and probabilities are employed by the RBC2 in making refined, clarifying classification decisions, and are employed by the RBC3 in making class-specific, threshold-based classification decisions, both as described above. The TBC class number is output by the RBC2 if no classification refinement is accomplished by the RBC2, while an alternative class number is output by the RBC2 if indeed classification refinement is achieved. The RBC3 operates like RBC1, outputting a class number or an index representing no class.

Figure 5C:
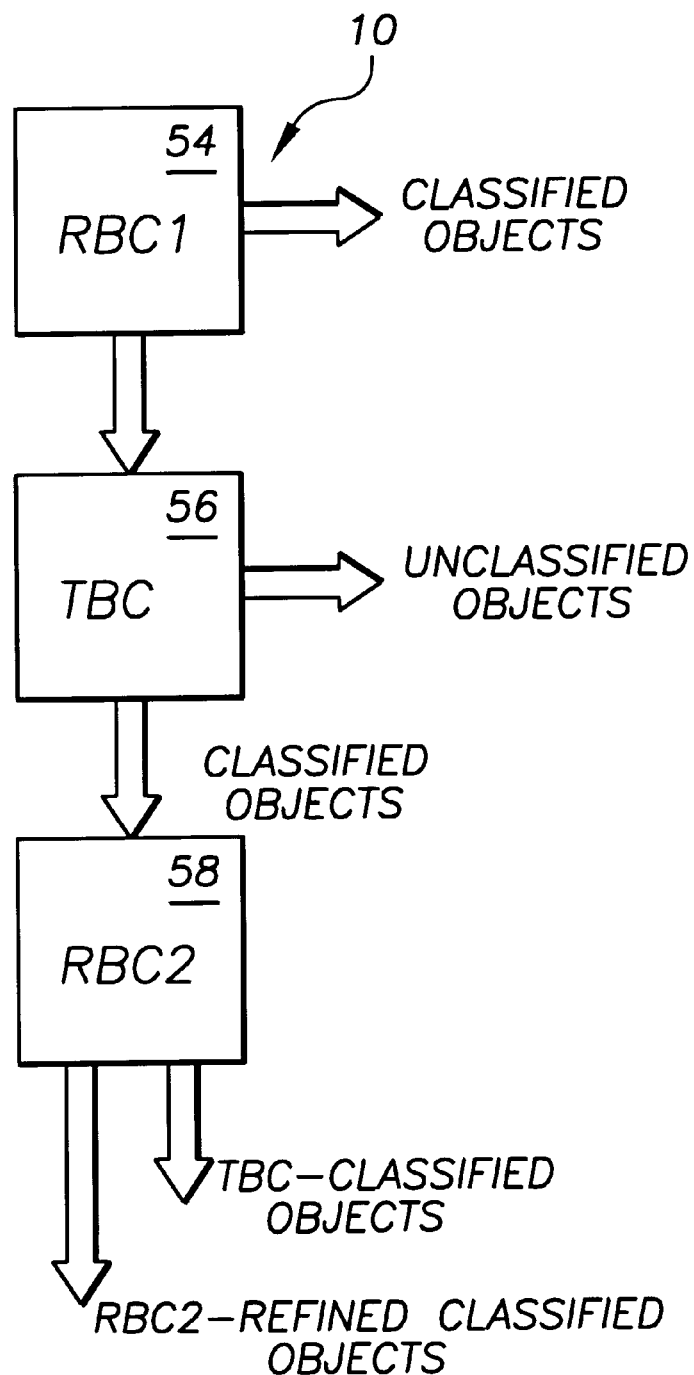

As object examples are continually collected during system operation and are found to correspond to those classes being handled by the RBC3, the TBC can be trained with those class samples to relieve those classes from the RBC3. Referring to FIG. 5C, eventually all of the classes handled by the RBC3 can be transferred to the TBC, given that adequate feature samples for the classes are collected, whereby the classifier 10 now can be configured with the RBC1 implemented with the classes most efficiently analyzed by it, with the TBC implemented to analyze all classes not handled by the RBC1, and with the RBC2 implemented to make refinement classification decisions for the TBC classes.

In many applications, however, it may be preferable to maintain the classifier configuration as shown in FIG. 5B with the RBC3 rule-based module employed with at least the initial RBC1 basic classification implementation, e.g., as given in Table II above. This configuration enables at least a broad classification of new and unknown classes that turn up as the classifier is operated over time, e.g., when new types of defects appear in a material manufacturing process due to some sudden change in the process. In this manner, new defects that cannot be recognized by the RBC1 or the TBC can be generally classified by the basic classification implementation of the RBC3, whereby manufacturing operators can be alerted to severe or important conditions. In addition, it may be preferable for many applications to retain the class-specific, threshold-based classification functionality of the RBC3 to augment the TBC-based classification decisions.

With this understanding of the classifier operation, general considerations for the range of classifier module implementations can be revisited. Specifically, for the RBC1, any rule-based classification technique can be employed that accommodates the possibility of unclassified objects. This characteristic is necessary for identifying the objects that are to be classified by the TBC due to the inability of the RBC1 in classifying such objects. Beyond classifier tables, rule-based classifiers such as decision trees and a wide-range of other preconfigurable, rule-based classifier configurations can here be employed. For the TBC, any automatic classification technique can be employed, preferably that, like the RBC1, accommodates the possibility of unclassified objects. If the TBC implementation does not accommodate unclassified objects, then the RBC3 cannot be used. While this configuration can be used, it is not preferable because it requires that any classes for which a training set is not accumulated must be resident in the RBC1. In many applications, e.g., material inspection, it is frequently not possible to accumulate an adequate training set, and new defects can be expected due to manufacturing changes. Thus, it is preferred that the TBC implementation accommodate the use of the RBC3 for maintaining some classes by the RBC3.

Preferably, the TBC implementation accommodates the identification of at least the two highest probability class indices and their corresponding probabilities, i.e., confidences, for enabling refined classification by the RBC2 and threshold-based classification by the RBC3. If only the single most probable class index is passed from the TBC to the RBC2, then only subclassification refinements can be accomplished by the RBC2, but the RBC2 can with this information make class-specific threshold-based classification decisions. As can be recognized, however, other information or a great deal more probability and/or class information can be produced by the TBC classification process.

Probabilistic automatic classifier configurations for the automatic classifier can be implemented as a Bayes-based configuration, a minimum distance configuration, a normal distribution configuration, probabilistic neural network configuration, or other suitable probabilistic configuration. Aside from probabilistic classifier configurations, back-propagation-based configurations such as back-propagation neural networks, radial-based configurations such as nearest neighbor or restricted coulomb energy configurations, or other suitable configuration can be employed as the automatic classifier. While not preferred, the automatic classifier implementation can also take the form of an automatic rule-based system, where suitable.

For the RBC2, any rule-based classification technique that can accommodate unclassified objects can be employed; here objects not classified by the RBC2 are assigned the class given them by the TBC. For the RBC3, any rule-based classification technique can be employed, generally without restriction.

In a preferred embodiment, the classifier system of the invention is configured to enable a feature selection process whereby the optimum features for a given classification application are identified. In one such process provided by the invention, an accumulated set of features is first ranked, by classifying all samples in a training set with the TBC for each feature alone in turn. The rank of a given feature is then defined as the percentage of samples that were correctly classified using only that feature. The ranked features are then sorted by rank in decreasing order. Table V below provides an example ranking for a five-feature set under consideration.

TABLE III

| Rank Number | Feature | Rank |
|---|---|---|
| 1 | Low Grayscale | 79.65 |
| 2 | Box Width | 40.62 |
| 3 | Total Area | 39.83 |
| 4 | Perimeter | 11.47 |
| 5 | Average Grayscale | 3.51 |

Then ranked features having a ranking below a preset threshold are discarded. In the scenario illustrated in Table III, e.g., use of a threshold of, e.g., 5% of the sum of all ranks, results in discarding of the feature called "Average Grayscale." Next in the process, an iterative compilation of a selected feature list is undertaken. The first feature in the list is that with the highest rank, from the ranking list, and the rank of the first feature in the list is defined to be the current maximum ranking. With this designation, the first feature is indicated to be a valid feature. Then, starting with that highest feature and the next highest feature of the sorted rank table, all of the samples in the TBC training set are classified using both features. If the percentage of samples classified using the two features is higher than the initial maximum percentage rank, then the second feature is indicated to be a valid feature along with the first feature, and the new percentage is marked as the current maximum ranking. This process is then repeated, adding the next feature in the sorted ranking table, until all features have been included in a classification operation.

If, in any of the iterations as features are added to the selected feature list and a classification operation is completed, the percentage of correct sample classifications is less than the current maximum, then the most-recently added feature to the list is indicated to be invalid, and the current classification percentage is not stored as the current maximum percentage. After all features have been included in the list and a corresponding classification operation, all features indicated to be valid are designated as those features optimally employed in the given classification application corresponding to the training set employed during the iterative process. The selected feature set is then supplied for configuration among the various classifier modules, and the features indicated to be invalid are discarded. Table IV below outlines characteristics of the resulting feature list as this process is iterated.

TABLE IV

| Iteration | Features Included | Classification Rank | Feature Accepted? | Updated Feature List |
|---|---|---|---|---|
| 1 | 1,2 | 98.91 | yes | 1,2 |
| 2 | 1,2,3 | 99.35 | yes | 1,2,3 |
| 3 | 1,2,3,4 | 99.35 | no | 1,2,3 |

Because features which are directed to similar properties can give similar classification results, it is possible that a feature considered in a later iteration of the list makes a previously-considered feature or features useless for enhancing classification success. To avoid this condition, it is preferable that an additional round of classification operation iterations be performed. Here, starting with the second to the last feature in the selected feature list, with the last feature being valid by definition, a TBC classification of the training set is performed using all but that feature. If the percentage of correctly classified samples is greater than or equal to the current maximum, then that feature is indicated to be not valid and is discarded from the set. This process is repeated, working through the feature list, until each feature has been considered. Table V below outlines characteristics of the resulting feature list as this process is iterated.

TABLE V

| Iteration | Features Included | Feature Excluded | Classification Rank | Feature Excluded? | Updated Feature List |
|---|---|---|---|---|---|
| 1 | 1,3 | 2 | 99.35 | yes | 1,3 |
| 2 | 3 | 1 | 39.83 | no | 1,3 |

This feature selection process identifies a set of features to be used by the classifier that maximizes classification accuracy and minimizes the number of features used, based on a defined training sample set for the TBC for the given application. The selected features are by definition the most preferable features to be employed by the TBC, but additionally, are useful in identifying important features to be included in the RBC1, RBC2, and/or RBC3 classifier modules. Once important features are identified, specific feature tests can be developed for use in the rule-based classifier modules, and features identified as being not important and that were previously implemented in the rule-based classifier modules can be removed from those modules if desired.

Turning now to specific implementation of the rule-based classifier modules, in one example, as described earlier, each rule-based classifier module is based on a classification table in which each row is assigned to a given class with columns of that row specifying feature tests which all must be "passed" by an object for that object to belong to that class. Feature values and range values can be, e.g., numeric or boolean. Range limits for a given feature can include a minimum value, a maximum value, or both. Numeric feature values, e.g., "minimum bounding box height," are stored as floating point numbers in a LUT formatted in memory. Boolean feature values, e.g., "repeating defect," are stored in the LUT with, e.g., a "1" value indicating "true," and a "0" value indicating "false."

To maximize speed and efficiency of the classifier, it is preferred that the classification LUT be defined such that the smallest number of class feature tests need be performed before a classification is made. To this end, it is preferred that whenever possible, the features used to define the classes be selected as those that are generally consistent for all objects of a given class. Of course, not all features for a given class are useful for classifying every object. For example, in the case of defect classes, many defects are not location-dependent, and so location features e.g., are not particularly useful in classifying defects. Additionally, some features that identify a specific type of defect may be more unique than others. For example, there may be several types of defects with a common width range, so that although width may be a necessary feature in identifying these defect types to distinguish them from, e.g., other similar defects that fall outside the width range, it is not alone sufficient to distinguish the defects.

Based on this consideration the feature tests of a given class row are preferably specifically ordered with the most unique feature first and the most common feature last. Because the first failure of an object to meet a feature test in a given row results in abandonment of that class row in making a classification decision, this ordering enhances speed and efficiency of the classification process. Similarly, the rows of classes in the LUT are preferably ordered based on the frequency of occurrence expected for the classes in a given application. The class rows are here ordered from that class of highest expected occurrence to the least common class. This results in fewer number of class row examinations prior to classification. Additionally, it is preferred that classes known to be more critical for a given application be located relatively higher in the table than less-critical classes, whereby objects falling into an intersection between given critical and less critical classes will be assigned the more critical class.

Considering classes and features that are preferably handled by the RBC1, i.e., the initial rule-based classifier module of the classifier system, Table VI below lists three example classes of different types of oil spots and corresponding features for each class for the RBC1 for an application in which steel strip defects are detected and classified. These classes are very common for the example application, and thus are preferably always implemented on the RBC1 and not the TBC or the other rule-based classifiers. Because none of the three oil spot defects is critical for the quality of the product in the example, and instead are used to monitor the production line quality, they are in the example all grouped as one and the same class of "oil spot."

TABLE VI

| Class Name | Feature | Feature test value |
|---|---|---|
| Oil Spot | Repeating Defect | False |
| | Low Grayscale | 70–110 |
| | High Grayscale | 80–140 |
| | Total Area | .5–2.5 sq. in. |
| | Box Height | .25–1.0 in. |
| | Height/Width Ratio | 25–30 |
| Oil Spot | Repeating Defect | False |
| | High Grayscale | 120–145 |
| | Low Grayscale | 105–135 |
| | Total Area | 0.73–3.25 sq. in. |
| | Height/Width Ratio | 0.8–1.3 |
| Oil Spot | Total Area | <0.002 sq. in. |
| | Repeating Defect | False |
| | Average Grayscale | 100–160 |
| | Low Grayscale | >100 |
| | High Grayscale | <140 |

Table VII below illustrates other examples of types of classes that are effectively configured in the RBC1, again for the example of classifying material defects, here steel defects. In the first example shown, the class "Ignore" is assigned to all defects with a bounding box bottom of less than 1 foot. Because the first foot of production material is in this example trim area, all defects in this region can be ignored. With this class definition, the RBC1 screen out areas of material that need not be considered.

The other example in the table is a class called "weld hole." In the example application here, such weld holes are purposely made in a steel strip to identify the location at which a weld has been made to join two strips together. Because the shape, dimensions, and position of these weld holes are typically well-determined by the production line process, it is uncomplicated to define a rule-based test for detecting them. Also, if the mechanism that produces the holes need be changed, whereby the hole characteristic is correspondingly changed, it is easier to change the rule-based classifier table rules rather than collecting new data to build a TBC training set for the adjusted holes. In the example, the holes are always of a circular shape, whereby a height-to-width ratio of close to "1" is required, the total area is known to always be about 1.3 square inches, and the horizontal center of a hole's bounding box is known to be located about 10 inches from the left edge of the material.

TABLE VII

| Class Name | Feature | Feature test value |
|---|---|---|
| Ignore | Box Bottom | <1 ft |
| Weld hole | Height/Width Ratio | 0.950–1.050 |
| | Total Area | 1.2–1.4 sq. in. |
| | Box X Center | 9.950–10.050 in. |

Considering the other rule-based classifier modules, recall that the RBC3 module is implemented with those classes not in the RBC1 and that have yet to be implemented in the TBC or that are to be perpetually maintained in the RBC3 module for, e.g., classifying newly produced objects. As can be understood, a wide range of classes can thus be defined in the RBC3, with no particular limit or requirement. The RBC2 classifier module is implemented with subclasses for refining the classification of the TBC, with validation tests for invalidating dubious TBC classification results, and with inter-class queries for making more precise classification decisions between two possible classes, as explained above.

Table VIII below lists three example classes and their features the RBC2 for the example application in which steel strip defects are detected and classified. The first two example classes, "lightning bolt-medium" and "lightning bolt-severe," are actually subclasses of the main class "lightning bolt," which can be configured in the TBC. These two subclasses divide those defects classified into the class "lightning bolt" into the "medium" subclass for lightning bolt defects of between 1–2 sq. inches, and into the "severe" subclass for lightning bolt defects of greater than 2 sq. inches. Note that the highest-probability class ascertained by the TBC is indicated.

In the third example of the table, refinement of a questionable TBC classification is accomplished. Here, two classes, namely, "sliver" and "oil streak," are known to in some cases be confused for each other by the TBC because these two classes look very much alike. However, it is known that the defect "sliver" is more severe than that of "oil streak," and should be weighted more heavily in a questionable classification between the two classes. Here, the RBC2 module is configured to definitively classify a defect as "sliver" which was classified by the TBC as "oil streak" when the second highest TBC classification probability was associated with the "sliver" classification, with the highest TBC classification probability being associated with "oil spot" but that probability being less than 1%.

TABLE VIII

| Class Name | Feature | Feature test value |
|---|---|---|
| Lightning Bolt - Medium | 1st TBC Class | Lightning Bolt |
|  | Total Area | 1–2 sq. in. |
| Lightning Bolt - Severe | 1st TBC Class | Lightning Bolt |
|  | Total Area | >2 sq. in. |
| Sliver | 2nd TBC Class | Sliver |
|  | 1st TBC Class | Oil Streak |
|  | 1st TBC probability | <.01 |

Turning now to an example implementation of the TBC, this automatic classifier is in one embodiment based on probability functions that indicate probabilities of an object having a given feature belonging to a given class. The base of knowledge on which the TBC makes classification decisions is here formed of a set of probability functions for the classes of the set of examples provided in training the classifier.

In the training process, a probability function is produced for each class based on one feature set permutation, with a probability function for each possible permutation produced for each class. The probability function $P_A(v)$, where $v=(v_1, \ldots, v_N)$ is a set of N features, defines the probability of a sample having feature set v belonging to the class A. Knowing the probabilities of all classes, then the so-called Bayes' decision rule can be invoked, whereby, assuming that the sample belongs to the class for which P(v) is largest, the overall error in the classification process is known to be minimized.

Typically, a probability function can be explicitly formulated for deterministic processes but not for stochastic processes. In the case of many classification applications such as defect classification, defect appearance is a stochastic, rather than deterministic process. Thus, an explicit class probability function cannot be formulated for such an application. In this case, in accordance with the invention, class probability functions are produced based on approximations of histogram distributions of the probabilities for values of the features in the class.

As explained earlier, before a training-based classifier module is configured in the classifier of the invention, the rule-based RBC1 classifier module can be employed to collect classification information and parse data based on the rule-based classification. As this goes on, a system operator can then manually classify feature samples produced by the RBC1 to produce a training set of samples having known and correct classification assignments. For example, considering the basic RBC1 rule-based classification table provided by the system for initial implementation of the RBC1, as in Table IV above, a system operator can examine the defects classified by this RBC1 implementation as "huge light" defects and collect all of those that are "huge hole" defects, thereby making appropriate classification determinations.

It is this resulting sample classification data that is used in the training process to formulate probability functions for the classes to be handled by the training-based classifier. Specifically, in the training process, for each defined class in the training set and for each selected feature of the samples in the training set, an array each of T integers is allocated in memory and initialized to zero, to store data for a probabilistic histogram to be built based on the training samples. Then data from each of the samples of the training set is examined, and for each defined feature, the minimum value, $F_{min}$, found for that feature, and the maximum value, $F_{max}$, found for that feature among all of the samples are determined across all of the classes and stored in an array.

Then, data from each of the training samples is again examined, and for a given sample, for each feature an index, k, is computed to be used as an index in determining a histogram element for that feature for the sample's class, as follows:

$$k = (F - F_{\min})T - \frac{1}{F_{\max} - F_{\min}}; \quad (1)$$

where F is the value of a given feature being examined for a given sample. T is the number of elements in the histogram array being built for the sample's class, and k=0 to T−1. Each feature histogram is thusly developed by mapping histogram data of the range of values for each feature to a histogram for each class that indicates the probability of a given feature for that class. This is done by defining the $k^{th}$ indexing element of the histogram for class A for which the given sample belongs by:

$$H_{A,F}(k) = H_{A,F}(k) + 1. \quad (2)$$

In a next step, the class histograms are smoothed by applying a gaussian filter, g(x), to non-boolean feature histogram data, where:

$$g(x) = \exp\left(-\frac{x^2}{2\sigma^2}\right); \quad (3)$$

where σ is the standard deviation of the gaussian profile and is preferably set to be large enough to fill in gaps in the class histograms caused by, e.g., unvisited indexing elements, without reducing the histogram to a flat profile. Specifically, the standard deviation is preferably set by testing the performance of the classifier; any of a large range of deviation values centered at about T/10 can typically be used with good results. After the smoothing process, the histograms are normalized to eliminate weighting based on unequal number of samples across the classes.

With this approach the training process produces a number of histograms corresponding to the product of the number of classes and the number of features. The number of index elements T of each histogram depends on how sparse the distributions of the feature values are, and represents the factor used to normalize the feature values. Larger values for T result in higher classifier resolution, but require larger values for the standard deviation used for the smoothing process, and require significantly more memory to store than smaller values.

In practice, the value for T is preferably determined by a given classification application. The training set is thus preferably used to build the class histograms with a large value for T, e.g., 512 or 1024, and then the value for T is reduced until the performance of the classifier is found to drop drastically. For example, in the case of steel defect classification, setting T=32, corresponding to a normalization of 5 bits, causes the performance of the classifier to drop by less than about 1 percent from that when a value of 512 is used.

Assuming that the features used in classification are statistically independent, the probability function of each class is in the case of multiple features computed using the gaussian-filtered histograms with the probability function $P_A$ for the class A is given as:

$$P_A(v) \cong \left( \prod_{f=1}^{N} P_f(v) \right)^{1/N} . \quad (4)$$

In this case, the histogram distributions are one-dimensional arrays, as in the one-feature case, and the amount of data produced during the probability computation grows linearly, not exponentially, with the number of features. This learning process has the advantage of being quite simple, and does not require a great deal of computational time. In addition, unlike automatic classifiers such as neural networks, this technique is guaranteed to converge to a finite and stable solution.

With this training sequence, the training-based classifier classifies an object by transforming an array of features into the index array given by expression (1) above, and then the probabilities for each class are computed using the approximate expression (4) above. Preferably, expression (4) above is computed using a logarithmic expression of that function such that only addition, not multiplication, of the probabilities is required, as follows:

$$\log(p(v)) = \log\left( \prod_f P_f(v) \right)^{1/F} = \sum_f \left[ \frac{1}{F} \log(P_f(v)) \right] . \quad (5)$$

Conventionally, training-based classifiers cannot discriminate which features are best used in describing various classes; indeed in some applications it is important to use specific features only for some classes, while some features may be exclusive for other classes. In the probabilistic trainable classifier provided by the invention, the importance of features can be weighted to indicate a desired importance for the features. In one example weighting technique, one of e.g., three weights, representing "normal," "irrelevant," and "essential," can be assigned to each feature.

In this scenario, if a feature is important for describing only some classes, that feature can be weighted as "irrelevant" for the other classes. In practice, when a feature is weighted as being unimportant for a given class, then the corresponding histogram is not computed by examination of training set data as in the above description, and instead, it is set to a constant value. In this way, the feature distribution for that class is treated in the same way as other distributions, without the necessity of conditional tests during the classification process, which would slow down the classifier speed.

Similarly, for the case in which a given feature is very important for describing a class, e.g., meaning that if a feature under test is outside the range of the distribution for the given feature then the sample whose feature under test definitively does not belong to the class, the given feature can be weighted as "essential." In this case, the corresponding histogram is not smoothed using expression (3) above, and the index elements of the histogram distribution that are not represented in the training set are not addressed, i.e., not assigned a value. In this way, elements not represented in the histogram by the samples remain zero for that class. It must be here noted that because it is not possible to compute the logarithm of zero, index elements that are not addressed are preferably set to some large negative number that is selected to avoid overflow in the summation expression.

Commonly, the value of a feature being tested during classification is found to be undefined due, e.g., to a division by zero in computation of the value, or is found to be out of the range of the training set. In such cases, training-based classifiers that require normalization of feature values typically are inoperable. In the training-based classifier module of the invention, this limitation is overcome by including two elements in the histogram array, namely, a first element for not valid values, and a second element for out-of-range values. The first element is filled using the training set in the manner described above, and the second element is set to small numbers for features weighted as "normal," to a constant value for features weighted as "irrelevant," and to zero for features weighted as "essential." With this arrangement, no additional conditional tests are needed in the classification process to avoid inoperable computation scenarios. As can be recognized, similar or other feature weighting techniques can be employed with a selected trainable classifier other than probabilistic classifiers.

It is here to be reiterated that as can be recognized, the specific implementations of rule-based and training-based classifiers described above are but examples of a wide-range of classifier module implementations that are suitable and are contemplated for the classifier of the invention.

Given any of the wide range of suitable classifier implementations, the output of the classifier is a set of objects having assigned classifications and optionally, in addition, a set of objects having no class assigned to them, i.e., being assigned the class "unknown." Recall that the term "object," as used throughout the description, is intended to refer to distinguishable characteristics of an article to be classified. As explained earlier, the classifier of the invention can be configured in a system that enables various post-classification processing of the classification data. For example, a workstation or other computer processor can be employed to build histogram plots of classification information for a given application, e.g., classified defects on a web material, with the histogram plots being displayed to indicate the distribution and severity of defects across the web material. Suitable apparatus can be connected to the system for, e.g., correspondingly marking defective material under inspection, mechanically rejecting defective material from a manufacturing sequence line, sounding an alarm, or other functions.

From the foregoing, it is apparent that the automatic classifier pursuant to the invention and described above not only provides reliable and efficient classification of article characteristics, but does so employing reconfigurable rule-based and training-based classifier modules that enable exploiting the performance strengths of each module while at the same time compensating for performance weaknesses. It is recognized, of course, that those skilled in the art may make various modifications and additions to the embodiments described above without departing from the spirit and scope of the present contribution to the art. Accordingly, it is to be understood that the protection sought to be afforded hereby should be deemed to extend to the subject matter claims and all equivalents thereof fairly within the scope of the invention.

We claim:

1. A classification system for classifying the characteristics of an article into classes of characteristics based on features associaated with the characteristics, the system comprising:

a first rule-based classifier providing rules that embody requirements of selected features so as to together define selected classes, the rules to be applied to measured features of an article characteristic to assign one of the selected classes to that characteristic, should the article characteristic meet the feature requirements of one of the selected classes; and a trainable classifier that is configured based on a training set of preclassified characteristics and a corresponding training class set which can include characteristic classes that are not the selected classses of the first-rule based classifier, the trainable classifier connected so as to accept from the first rule-based classifier an article characteristic not classified by the first ruled-based classifier, to assign one of the training set classes to thea characteristic, should the trainable classifier configuration associate that characteristic with one of the training set classes.

2. A classification system for classifying charateristics of an article into classes of characteristics based on features associated with the characteristics, the system comprising:

a trainable classifier configured based on a training set of preclassified characteristics for assigning one of the training set classes to an article characteristic, should the trainable classifier configuration associate that characteristic with one of the training set classes; and a first rule-based classifier connected so as to accept from the trainable classier a classified article characteristic for refining classification of that characteristic, the first rule-based classifier providing refinement rules embodying requirements of selected refinement features so as to together define refinement classes, the refinement rules to be applied to measured features of the classified article characteristic for assignment one of the refinement classes to the classified characteristic, should the classified characteristic meet the refinement feature requirements of one of the refinement classes.

3. A classification system for classifying characteristics of an article into classes of characteristics based on features associated with the characteristics, the system comprising:

a trainable classifier configured based on a training set of preclassified characteristics for assigning one of the training set classes to an article characteristic, should the trainable classifier configuration associate that characteristic with one of the training set classes; and a first rule-based classifier connected so as to accept from the trainable classifier an article characteristic not classified by the trainale classifier, the first rule-based classifier providing rules that embody requirements of selected features to as to together define selected classes, the rules to be applied to measured features of the unclassified article characteristic for assigning one of the selected classes to the unclassified characteristic, should the unclassified article characteristic meet the feature requirements of one of the selected classes.

4. A classification system for classifying characteristics of an article into classes of characteristics based on features associated with the characteristics, the system comprising:

a first rule-based classifier providing rules that embody requirements of selected features so as to together define selected classes, the rules to be applied to measured features of an article characteristic to assign one of the selected classes to that characteristic, should the article characteristic meet the feature requirements of one of the selected classes;

a trainable classifier configured based on a training set of preclassified characteristics, the trainable classifier connected so as to accept from the first rule-based classifier an article characteristic not classified by the rule based classifier, to assign one of the training set classes to that characteristic, should the trainable classifier configuration associate that characteristic with one of the training set classes; and a second rule-based classifier connected so as to accept from the trainable classifier an article characteristic not classified by the trainable classifier and the first rule-based classifier, the second rule-based classifier providing rules that embody requirements of selected features so as to together define selected classes, to be applied to measured features of the unclassified article characteristic for assigning to the unclassified characteristic one of the selected classes, should the unclassified characteristic meet the feature requirements of one of the selected classes.

5. A classification system for classifying characteristics of an article into classes of characteristics based on features associated with the characteristics, the system comprising:

a first-rule based classifier providing rules that embody requirements of selected features so as to together define selected classes, the rules to be applied to measured features of an article characteristic to assign one of the selected classes to that characteristic, should the article characteristic meet the feature requirements of one of the selected classes;

a trainable classifier configured based on a training set of preclassified characteristics, the trainable classifier connected so as to accept from the first rule-based classifier an article characteristic not classified by the rule based classifier, to assign one of the training set classes to that characteristic, should the trainable classifier configuration associate that characteristic with one of the training set classes; and a second rule-based classifier connected so as to accept from the trainable classifier a classified article characteristic for refining classification of that characteristic, the second rule-based classifier providing refinement rules that embody requirements of selected refinement features so as to define refinement classes, the refinement rules to be applied to measured features of the classified article characteristic to assign one of the refinement classes to the classified characteristic, should the classified characteristic meet the refinement feature requirements of one of the refinement classes.

6. The classification system of claim 1 wherein the selected classes defined by rules of the first rule-based classifier comprise classes expected to be frequently assigned to article characteristics of interest and classes for which assignment to characteristics of interest, based on rigid feature requirements, is expected to be accomplished with at least a minimum prespecified level of confidence.

7. The classification system of any of claims 1, 2, or 3, further comprising means for choosing the features of the preclassified characteristic training set based on a comparison of percentage of training set characteristics that are associated by the trainable classifier with the class known to be correct for each respective training set characteristic, the comparison carried out as each possible feature is added to a set of possible features, each feature being added in an order beginning with a feature known to provide a highest degree of correctness in association by the trainable classifier with the characterisitic training set, based on that feature, any possible feature for which comparison of the association percentage of the training set using a current feature accumulation in the set of possible features is less than an association percentage for a just preceeding feature accumulation in the set being indicated as not to be chosen as a feature of the preclassified characteristic training set.

8. The classification system of any of claims 1, 2, or 3, further comprising means for generating the measured features of characteristics of the article.

9. The classification system of claim 8 further comprising means for acquiring characteristic information from the article to be examined for generating the measured features.

10. The classification system of any of claims 1, 2, or 3, wherein the rules provided by the first rule-based classifier are configured as a classification table, with each classification table row corresponding to a selected class and each column of a given class row corresponding to a feature requirement for that class.

11. The classification system of claim 5 further comprising a third rule-based classifier connected so as to accept from the trainable classifier an article characteristic not classified by the trainable classifier and the first rule-based classifier, the third rule-based classifier providing rules that embody requirements of selected features, so as to together define selected classes, the rules to be applied to measured features of the unclassified article characteristic for assigning one of the selected classes to the unclassified characteristic, should the unclassified characteristic meet the feature requirements of one of the selected classes.

12. The classification system of any of claims 4, 11, or 3, wherein a plurality of rules provided by the rule-based classifier that is connected so as to accept from the trainable classifier an unclassified article characteristic relate to a prespecified minimum degree of confidence of classificaiton assignment by the trainable classifier, one degree of confidence of each of a corresponding plurality of selected classes, a corresponding minimum degree of confidence required for assignment of a given one of the plurality of selected classes to the unclassified article characteristic.

13. The classification system of any of claims 1, 2, or 3, wherein the trainable classifier is configured based on probability functions that are constructed based on probability of association by the trainable classifier of each characteristic of the preclassified characteristic training set with a corresponding known respective class for that characteristic.

14. The classification system of claim 13 wherein at least one feature of characteristics in the training set is weighted for each class in the training set as a function of degree of criticality of that feature in correct association of a characteristic with that class.

15. The classification system of either of claims 2 or 5, wherein the refinement characteristic classes comprise characteristic subclasses of at least one training set class of the trainable classifier.

16. The classification system of either of claims 2 or 5, wherein the refinement characteristic classes comprise classes defined by confirmational feature requirements for confirming validity of trainable classifier class associations.

17. The classification system of either of claims 2 or 5, wherein the refinement characteristic classes comprise classes defined by clarification feature requirements for clarifying a trainable classifier class association between two classes for which confusion between the two classes is possible.

18. The classification system of any of claims 4, 11 or 3, wherein the rules provided by the rule-based classifier that is connected so as to accept an unclassified article from the trainable classifier are configured as a classification table, with each classification table row corresponding to a selected class and each column of a given class row corresponding to a feature requirement for that class, the classes selected for enabling classification of article characteristics undefined by another classifier in the classification system.

19. The classification system of claim 2 further comprising:
 a second rule-based classifier connected so as to accept from the trainable classifier an article characteristic not classified by the trainable classifier, the second rule-based classifier providing rules that embody requirements of selected features to as to together define selected classes, the rules to be applied to measured features of the unclassified article characteristics for assigning one of the selected classes to the unclassified characteristic, should the unclassified article characteristic meet the feature requirements of one of the selected classes.

20. An image classification system comprising:
 feature extraction means responsive to an image of an article to produce feature information about characteristics of the article for classification of the characteristics into classes;
 a first rule-based classifier providing rules that embody requirements of selected features so as to together define selected classes, the rules to be applied to the extracted feature information of a given characteristic for assigning one of the selected classes to that characteristic, should the article characteristic meet the feature requirements of one of the selected classes;
 a trainable classifier configured based on a training set of preclassified characteristics, the trainable classifier connected so as to accept from the first rule-based classifier an article characteristic not classified by the rule based classifier, to assign one of the training set classes to that characteristic, should the trainable classifier configuration associate that characteristic with one of the training set classes;
 a second rule-based classifier connected so as to accept from the trainable classifier a classified article characteristic for refining classification of that characteristic, the second rule-based classifier providing refinement rules that embody requirements of selected refinement features so as to together define refinement classes, the refinement rules to be applied to extracted features of the classified article characteristic to assign one of the refinement classes to the classified characteristic, should the classified characteristic meet the refinement feature requirements of one of the refinement classes; and a third rule-based classifer connected so as to accept form the trainable classifier an article characteristic not classified by the trainable classifier and the first rule-based classifier, the third rule-based classifier providing rules that embody requirements of selected features so as to together define selected classes, the rules to be applied to extracted features of the unclassified article characteristic to assign one of the selected classes to that characteristic, should the article characteristic meet the feature requirements of one of the selected classes.

21. A method for classifying characteristics of an article into classes of characteristics based on features associated with the characteristics, the method comprising:

applying rules, that embody requirements of selected features so as to define selected classes, to measured features of an article characteristic to be classified;

assigning one of the selected classes to the article characteristic, should the characteristic meet the feature requirements of the rules for one of the selected classes; and providing a characteristic that is not assigned one of the selected classes to the trainable classifier that is configured based on a training set of preclassified characteristics and a corresponding training class set which can include characteristic classes that are not the selected classes, the trainable classifier assigning one of the training set classes to the unclassified characteristic, should the trainable classifier configuration associate that characteristic with one of the training set classes.

22. A method for classifying characteristics of an article into classes of characteristics based on features associated with the characteristics, the method comprising:

applying rules, that embody requirements of selected features so as to define selected classes, to measured features of an article characteristic to be classified;

assigning one of the selected classes to the article characteristic, should the characteristic meet the feature requirements of the rules for one of the selected classes;

providing a characteristic that is not assigned one of the selected classes to a trainable classifier that is configured based on a training set of preclassified characteristics, the trainable classifier assigning one of the training set classes to the unclassified characteristic, should the trainable classifier configuration associate that characteristic with one of the training set classes;

accepting an unclassified article characteristic from the trainable classifier;

applying to measured features of the unclassified characteristic rules that embody requirements of selected features so as to together define selected classes; and assigning one of the selected classes to the unclassified characteristic, should the unclassified characteristic meet feature requirements of the rules for one of the selected classes.

23. A method for classifying characteristics of an article into classes of characteristics based on features associated with the characteristics, the method comprising:

applying rules, that embody requirements of selected features so as to define selected classes, to measured features of an article characteristic to be classified;

assigning one of the selected classes to the article characteristic, should the characteristic meet the feature requirements of the rules for one of the selected classes;

providing a characteristic that is not assigned one of the selected classes to a trainable classifier that is configured based on a training set of preclassified characteristics, the trainable classifier assigning one of the training set classes to the unclassifed characteristic, should the trainable classifier configuration associate that characteristic with one of the training set classes;

accepting a classifed article characteristic from the trainable classifier;

applying to measured features of the classified characteristic refinement rules that embody requirements of refinement features so as to together define refinement classes; and assigning one of the refinement classes to the classified characteristic, should the classified characteristic meet the refinement feature requirements of the refinement rules for one of the refinement classes.

* * * * *